(12) United States Patent
Braun et al.

(10) Patent No.: US 9,860,200 B1
(45) Date of Patent: Jan. 2, 2018

(54) MESSAGE SUGGESTIONS

(71) Applicant: Google Inc., Mountain View, CA (US)

(72) Inventors: Max Benjamin Braun, San Francisco, CA (US); Nirmal Jitendra Patel, Mountain View, CA (US)

(73) Assignee: Google LLC, Mountain View, CA (US)

( * ) Notice: Subject to any disclaimer, the term of this patent is extended or adjusted under 35 U.S.C. 154(b) by 473 days.

(21) Appl. No.: 14/470,904

(22) Filed: Aug. 27, 2014

(51) Int. Cl.
*G06N 99/00* (2010.01)
*H04L 12/58* (2006.01)

(52) U.S. Cl.
CPC ......... *H04L 51/046* (2013.01); *G06N 99/005* (2013.01)

(58) Field of Classification Search
CPC ........................... H04L 51/046; G06N 99/005
USPC .......................................................... 706/12
See application file for complete search history.

(56) References Cited

U.S. PATENT DOCUMENTS

| | | | |
|---|---|---|---|
| 7,752,159 B2 | 7/2010 | Nelken et al. | |
| 7,788,327 B2 * | 8/2010 | Naito .................. | G06F 17/2818 709/204 |
| 8,209,183 B1 * | 6/2012 | Patel ........................ | G06K 9/72 382/181 |
| 8,639,276 B2 | 1/2014 | Sharpe et al. | |
| 8,977,255 B2 * | 3/2015 | Freeman ........... | H04M 1/72522 455/425 |
| 9,471,561 B2 * | 10/2016 | Baldwin ............... | G06F 17/273 |
| 2004/0176114 A1 | 9/2004 | Northcutt | |
| 2012/0030157 A1 * | 2/2012 | Tsuchida ............... | G06F 17/278 706/20 |
| 2012/0173464 A1 | 7/2012 | Tur et al. | |
| 2012/0254318 A1 | 10/2012 | Poniatowskl | |
| 2012/0290662 A1 * | 11/2012 | Weber .................. | G06N 99/005 709/206 |
| 2014/0341462 A1 * | 11/2014 | Sezginer ............... | G06T 7/0008 382/149 |

\* cited by examiner

*Primary Examiner* — Stanley K Hill
*Assistant Examiner* — Tsu-Chang Lee
(74) *Attorney, Agent, or Firm* — McDonnell Boehnen Hulbert & Berghoff LLP

(57) ABSTRACT

A method implemented at least in part on a head-mountable device (HMD) may involve: for each of one or more messages that are selected from a plurality of messages from an account: (a) extracting one or more phrases from a respective selected message; (b) determining that a conversation includes the selected message and one or more other messages from the plurality of messages; (c) generating a first feature vector based on the conversation; and (d) generating one or more training-data sets that include one or more of the phrases and the first feature vector. The method also includes training a machine-learning application with at least a portion of the one or more training-data sets, and applying the trained machine-learning application to process an incoming message and to determine one or more reply messages corresponding to the incoming message. The method may display the reply message(s) on a graphic display of the HMD.

22 Claims, 13 Drawing Sheets

Multi-Tiered User Model 400

Basic

Tap = Select
Swipe forward/away = Choose next
Swipe backward/toward = Choose previous
Swipe down = Back/Home/Sleep Voice = Access voice menu
Camera button press = Take a photo

Intermediate

Tap = Select
Swipe forward/away = Choose next
Swipe backward/toward = Choose previous
Swipe down = Back/Home/Sleep Voice = Access voice menu
Camera button press = Take a photo
Camera button long press = Capture menu Two finger swipe forward/away = Z-axis move away
Two finger swipe backward/toward = Z-axis move toward
Two finger swipe down = Sleep

Advanced

Tap = Select
Swipe forward/away = Choose next
Swipe backward/toward = Choose previous
Swipe down = Back/Home/Sleep Voice = Access to voice menu
Camera button press = Take a photo
Camera button long press = Capture menu Two finger swipe forward/away = Z-axis move away
Two finger swipe backward/toward = Z-axis move toward
Two finger swipe down = Sleep Two finger press and hold = The clutch Nudge = HMD wake / sleep

FIGURE 10

MESSAGE SUGGESTIONS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

SUMMARY

The present disclosure relates to providing canned messages based, at least in part, on communications associated with a user account (e.g., a user's phone number, email address, username, and the like).

In an aspect, a method includes, for each of one or more messages that are selected from a plurality of messages from an account: (a) extracting one or more phrases from a respective selected message; (b) determining that a conversation includes the selected message and one or more other messages from the plurality of messages; (c) generating a first feature vector based on the conversation, wherein the first feature vector includes one or more first features that include one or more words from the conversation; and (d) generating, by the computing system, one or more training-data sets, wherein each training-data set comprises one of the phrases and the first feature vector. In this aspect, the method also includes training, by the computing system, a machine-learning application with at least a portion of the one or more training-data sets that are generated for the one or more selected messages; applying the trained machine-learning application to process an incoming message to the account and to determine one or more reply messages corresponding to the incoming message; and initiating a display of the one or more reply messages on a graphic display.

In another aspect, a system includes a non-transitory computer-readable medium and program instructions stored on the non-transitory computer-readable medium. The program instructions are executable by at least one processor to, for each of one or more messages that are selected from a plurality of messages from an account: (a) extract one or more phrases from a respective selected message; (b) determine that a conversation includes the selected message and one or more other messages from the plurality of messages; (c) generate a first feature vector based on the conversation, wherein the first feature vector includes one or more first features that include one or more words from the conversation; and (d) generate one or more training-data sets, wherein each training-data set comprises one of the phrases and the first feature vector. The program instructions may also be executable to train a machine-learning application with at least a portion of the one or more training-data sets that are generated for the one or more selected messages; apply the trained machine-learning application to process an incoming message to the account and to determine one or more reply messages corresponding to the incoming message; and initiate a display of the one or more reply messages on a graphic display.

In a further aspect, a non-transitory computer-readable medium includes stored thereon instructions executable by a computing device to cause the computing device to perform various functions. The functions include, for each of one or more messages that are selected from a plurality of messages from an account: (a) extracting one or more phrases from a respective selected message; (b) determining that a conversation includes the selected message and one or more other messages from the plurality of messages; (c) generating a first feature vector based on the conversation, wherein the first feature vector includes one or more first features that include one or more words from the conversation; and (d) generating, by the computing system, one or more training-data sets, wherein each training-data set comprises one of the phrases and the first feature vector. The functions also include training, by the computing system, a machine-learning application with at least a portion of the one or more training-data sets that are generated for the one or more selected messages; applying the trained machine-learning application to process an incoming message to the account and to determine one or more reply messages corresponding to the incoming message; and initiating a display of the one or more reply messages on a graphic display.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 10 shows example operations of a multi-tiered user model for a user interface for a HMD, according to an embodiment.

DETAILED DESCRIPTION

Figure 1:
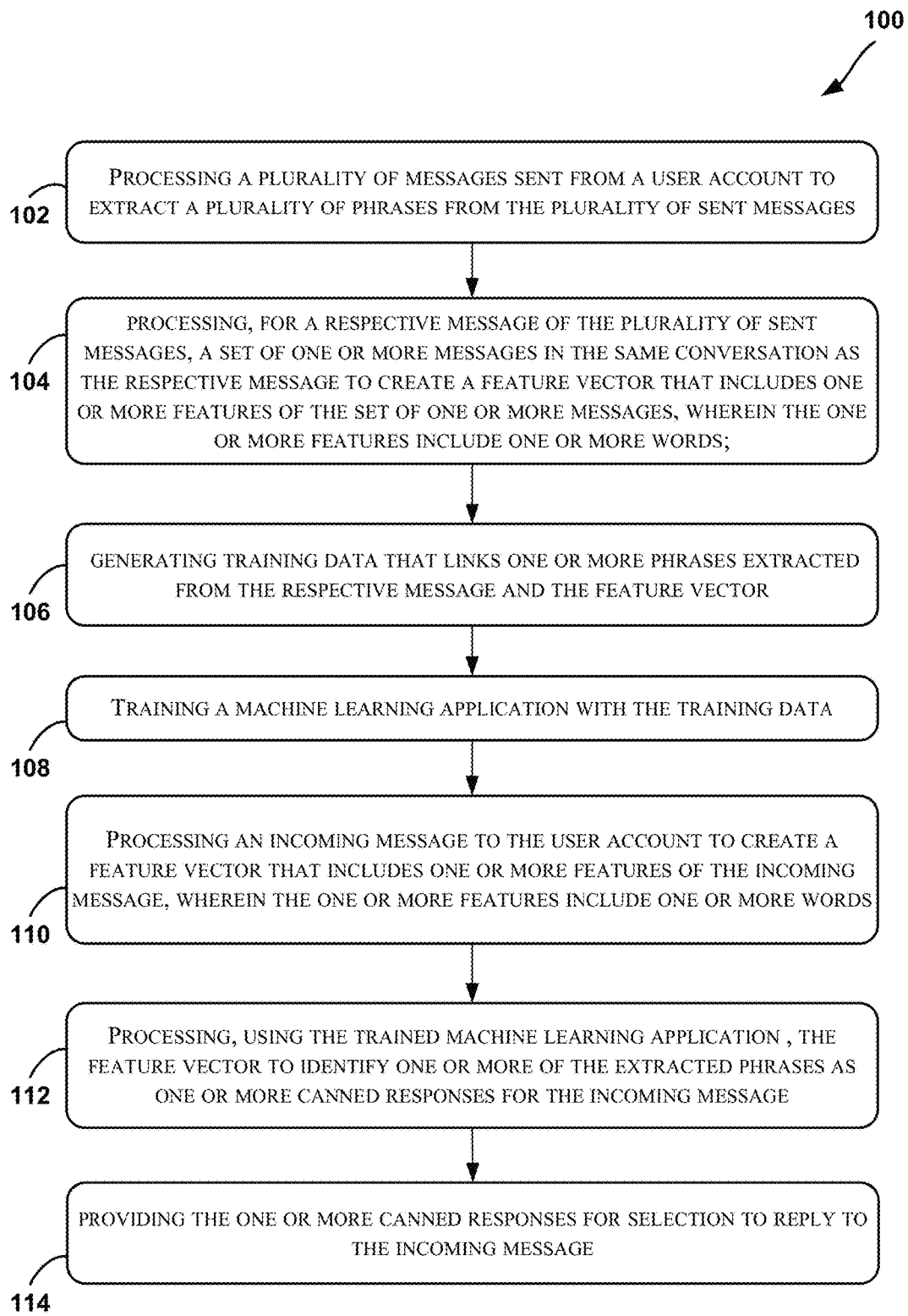
FIG. 1 is a flow chart illustrating a method, according to an embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

Example computing systems, such as mobile computing platforms (e.g., mobile phones and associated servers), or stationary computing platforms (e.g., desktop computers and laptop computers), can be configured to adapt to users of the system.

In one embodiment, a computing system trains a machine-learning application with training data to determine smart "canned" messages that can be selected and inserted into a message to be sent. The computing system may develop the training data by processing the user's messaging history, for instance. In one example, when the user receives an incoming communication or message on a computing system or device (e.g., a mobile phone), the machine-learning application can provide the user with one or more contextually relevant and personalized canned responses to the incoming communication. A list of canned messages may be provided to a user on a graphic display. The user can then select a canned response to send in reply to the incoming communication.

In one example, a user's head-mounted display (HMD) receives a text message from their friend, Bob, that says "Do you want to get coffee". The HMD displays the text message, as well as several intelligently selected responses, which can be customized based, for example, on the user's past interactions with Bob and/or other people, the current context of the user, and other factors. For instance, when the text message is displayed, the HMD could also display "Sure", "When is good for you?", and ":)" as canned messages. The HMD user can quickly select one of the displayed response messages by speaking it, looking at it, or otherwise selecting it.

Examples discussed herein may be directed to text communications (e.g., SMS messages, emails, instant messages (IMs), personal messages (PMs), and the like), although other types of communications are also contemplated, such as voice communications.

Within examples, by providing applications access to a machine adaptation techniques designed to operate on and learn about user behavior of a computing platform, the machine-learning application can make computing systems easier to use, more efficient from a user's point of view, and save user's time and effort in utilizing the variety of applications available on the computing system.

Example Methods for Providing Smart Canned Messages

FIG. 1 is a flow chart illustrating a method 100, according to an example embodiment. The example method 100 processes communications associated with a user account (e.g., sent and received text messages, emails, IMs, PMs, telephone calls, voicemails, and the like) to generate training data that a computing system can use to train a machine-learning application. The computing system can then use the trained machine-learning application to process an incoming message and provide one or more relevant and personalized canned responses that can be selected to include in a reply to the incoming message.

The method 100 is described by way of example as being carried out by mobile computing system, which may include a mobile device (such as a smartphone, tablet computer, or HMD) that is communicatively coupled to a server system (one or more servers). In one example, text and voice communications that are intended for a user account associated with the mobile device are routed through the server system, and the server system may be configured to process the communications to generate the training data, to train the machine-learning application, and/or to provide one or more canned responses for display and selection on the mobile device. In another example, the mobile device may be configured to process communications to generate training data, to provide additional information for processing by the server system, to train the machine-learning application, and/or to provide the one or more canned responses for display and selection.

More specifically, at block 102 of method 100, the computing system processes a plurality of messages sent from a user account to extract a plurality of phrases from the plurality of sent messages. In one example, at block 102, the computing system splits respective messages into phrases and normalizes the phrases. The computing system can utilize a natural language toolkit (NLTK) sentence tokenizer to divide text into one or more phrases. Generally, the computing system can normalize the phrases by converting each letter to lowercase and removing non-essential punctuation (e.g., the normalization may keep question marks). The process of normalizing the phrases may also keep stop words (e.g., a, and, the, it, is, on, etc.) in the phrases.

Figure 2:
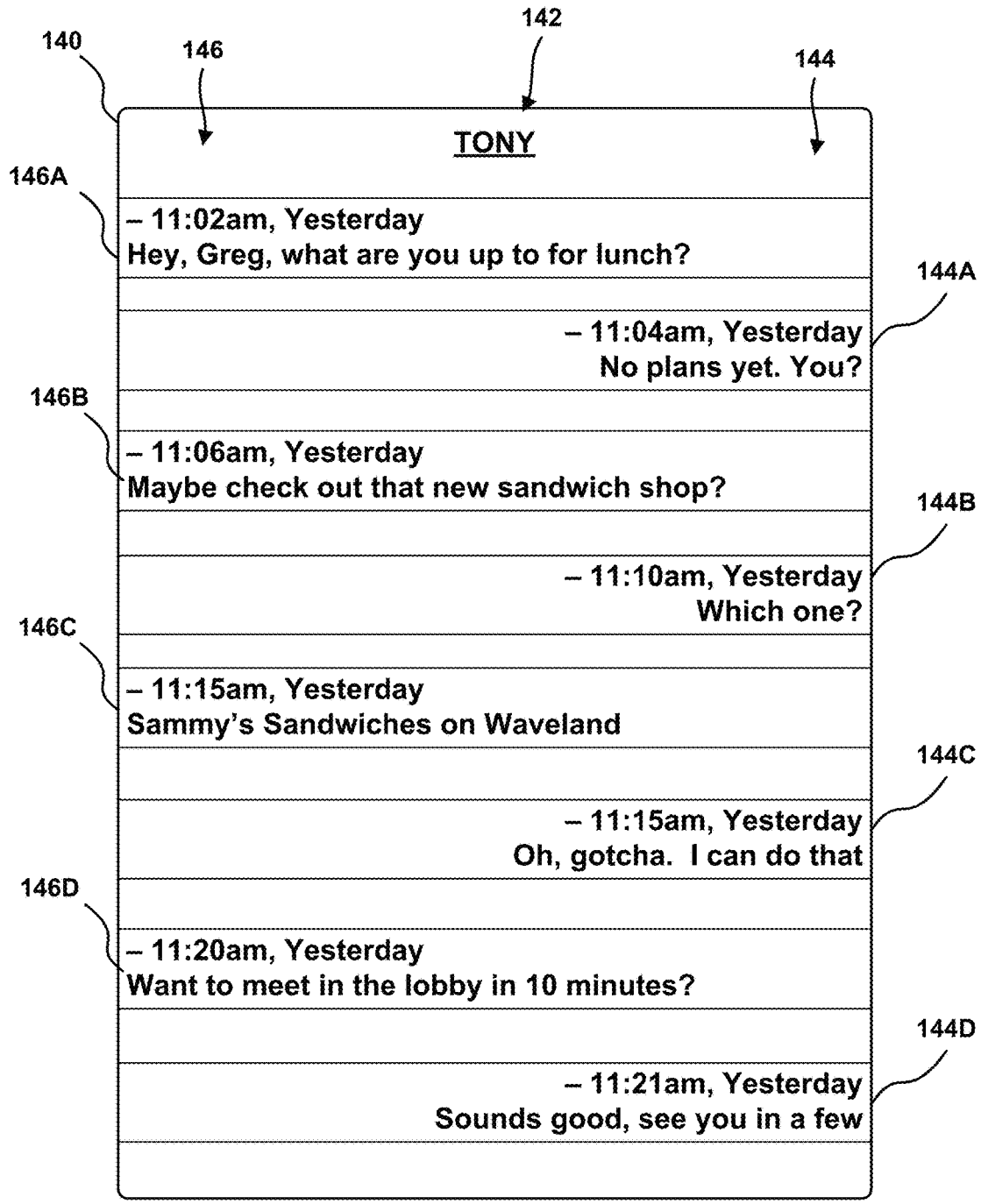
FIG. 2 is an example conversation displayed on a mobile device, according to an embodiment.

FIG. 2 illustrates a mobile device 140 that is displaying an example conversation 142 between two individuals, Tony and Greg. In the present example, the mobile device 140 is associated with the user account of Greg, and messages 144 on a right side of the device were sent from Greg to Tony. Messages 146 on a left side of the device were sent from Tony to Greg.

Using the conversation 142 as an example, at block 102, the computing system may process the conversation to identify the messages 144 that were sent from Greg's user account, and to extract phrases from the identified messages. Thus, in this example, the computing system may extract the following phrases (no plans yet), (you?), (which one?), (oh), (gotcha), (i can do that), (sounds good), and (see you in a few). In other examples, different lists may be extracted based, perhaps, on different phrase extraction algorithms or techniques. These phrases are generally normalized, as discussed above, to convert the letters to lowercase and to remove non-essential punctuation.

However, in other examples, the computing system may use different normalization processes, which may result in different phrases. Further, in other examples, the computing system may use other language tokenizers or phrase extraction techniques, which may also result in different phrases. After extracting the phrases, the computing system may store the extracted phrases for later use, as will be described in more detail.

At block 104 of method 100, the computing system processes, for a respective message of the plurality of sent messages, a set of one or more messages in the same conversation as the respective message to create a feature vector that includes one or more features of the set of one or more messages. For instance, the feature vector may count instances of one or more features of the set of one or more messages. The set of one or more messages may include the respective sent message or not. In another example, the processing at block 104 may operate on a set of one or more messages from the same sender, although, the message(s) may not necessarily be associated with the same conversation as the respective sent message. In one example, the one or more first features include one or more words in the set of one or more messages, and at block 104, the computing system creates the feature vector using a bag-of-words model or an n-gram model. In the N-gram model, N may be an integer, such as 1 in the bag-of-words model, or N may be 2, 3, 4, and the like, and each feature may represent a group of N consecutive words from the message(s). The resulting feature vector is generally a sparse vector that counts the occurrences of each feature found in the subset of messages.

In one example, the processing at block 104 may be performed as each message is sent from the user account and, thus, the processing operates on prior messages. Although, in some examples, the processing at block 104 may operate on prior and/or subsequent messages. Further, the processing at block 104 may operate on a set of N (e.g., 3) messages that immediately precede (and/or come after) a respective sent message.

Referring to FIG. 2, for the respective sent message 144A, for example, the computing system may process a set of three preceding messages 144A, 146A, 146B to create the feature vector, which can take the form [(feature1) (count of feature1), (feature2) (count of feature2) . . . ]. In one example, at block 104, the computing system creates the feature vector by normalizing the set of messages by converting letters to lowercase, removing stop words, and removing punctuation, for example. In the present example, the stop words may include what, are, you, up to, for, no, maybe, out, that, and new. The computing system may remove these and others (or fewer) stop words in order to generate a more meaningful feature vector. Thus, in the present example, the resulting feature vector of the set of three preceding messages 144A, 146A, 146B may take the form [hey 1, greg 1, lunch 1, plans 1, check 1, sandwich 1, shop 1].

In other examples, at block 104, the computing device may also normalize the set of message(s) by converting ASCII emoticons to their Unicode form, which also become features. If a message includes an image or Internet link, the computing device may treat the images/links as a single generic feature or as multiple generic features. In addition, the computing system may treat hashtags as words (features) without the "#" character. Further, the computing system may also include the sender's identity as a feature (e.g., in the form of a hashed gaia ID, such as the sender's phone number). Other data that may be included as features include a time of day that a message was sent or received. In another example, at block 104, the computing system may also process calls that were received (or missed) from a recipient of the respective sent message, and include data related to these calls as features in the feature vector. The data related to the calls may be included as one or more features that indicate, for example, a user that made the call, whether the call was received or missed, a time that the call was received or missed, and the like.

At block 106 of method 100, the computing system generates training data (or training-data sets) that links one or more phrases extracted from the respective message and the respective feature vector. This training data may take the form of a tuple for each phrase. In one example, a respective tuple may take the form [(phrase), (sender ID), (feature1) (count of feature1), (feature2) (count of feature2) . . . ] Referring again to the example above where the message 144B is the respective message, the respective tuple may take the form [which one?, (Tony ID), hey 1, greg 1, lunch 1, plans 1, check 1, sandwich 1, shop 1]. Generally, in the context of machine learning applications, each phrase becomes a label and the features (e.g., words, sender ID, Unicode representations of emoticons, time of day, voice calls, and the like) in the previous messages form the feature vector.

In practice, the computing system may iteratively perform the processes of blocks 104, 106 for multiple sent messages from the user account to build up the training data.

At block 108, the computing system trains a machine learning application with the training data. The training may be performed using one or more statistical classification techniques, such as, but not limited to, linear classifiers, support vector machines, quadratic classifiers, kernel estimation, decision trees, artificial neural networks, support vector machines, Bayesian techniques and/or networks, hidden Markov models, binary classifiers, and/or multi-class classifiers, for example. Before the computing system trains the machine learning application, the computing system may also remove tuples that correspond to phrases that occur less than M (e.g., 2) times, because such phrases may be too specific and may pollute the training data. The computing system may then train the machine learning application with the remaining tuples as the training data.

At block 110, the computing system processes an incoming message to the user account to create a feature vector for the incoming message, similarly to the process described above. For instance, referring to FIG. 3, an incoming message 146E from the same sender as in FIG. 2, Tony, is received. The computing system may process the incoming message to create a feature vector of the form [lunch 1, plans 1].

At block 112, the computing system uses the trained machine-learning application (block 108) to process the feature vector of the incoming message (block 110) to identify one or more of the extracted phrases (block 102) as one or more canned responses for the incoming message. Generally, the machine-learning application maps particular phrases with the feature vector of the incoming message to identify the phrases that may be most relevant as potential responses to the incoming message. At block 112, the computing system may rank the identified phrases in order of most relevant or most probable responses.

Figure 3:
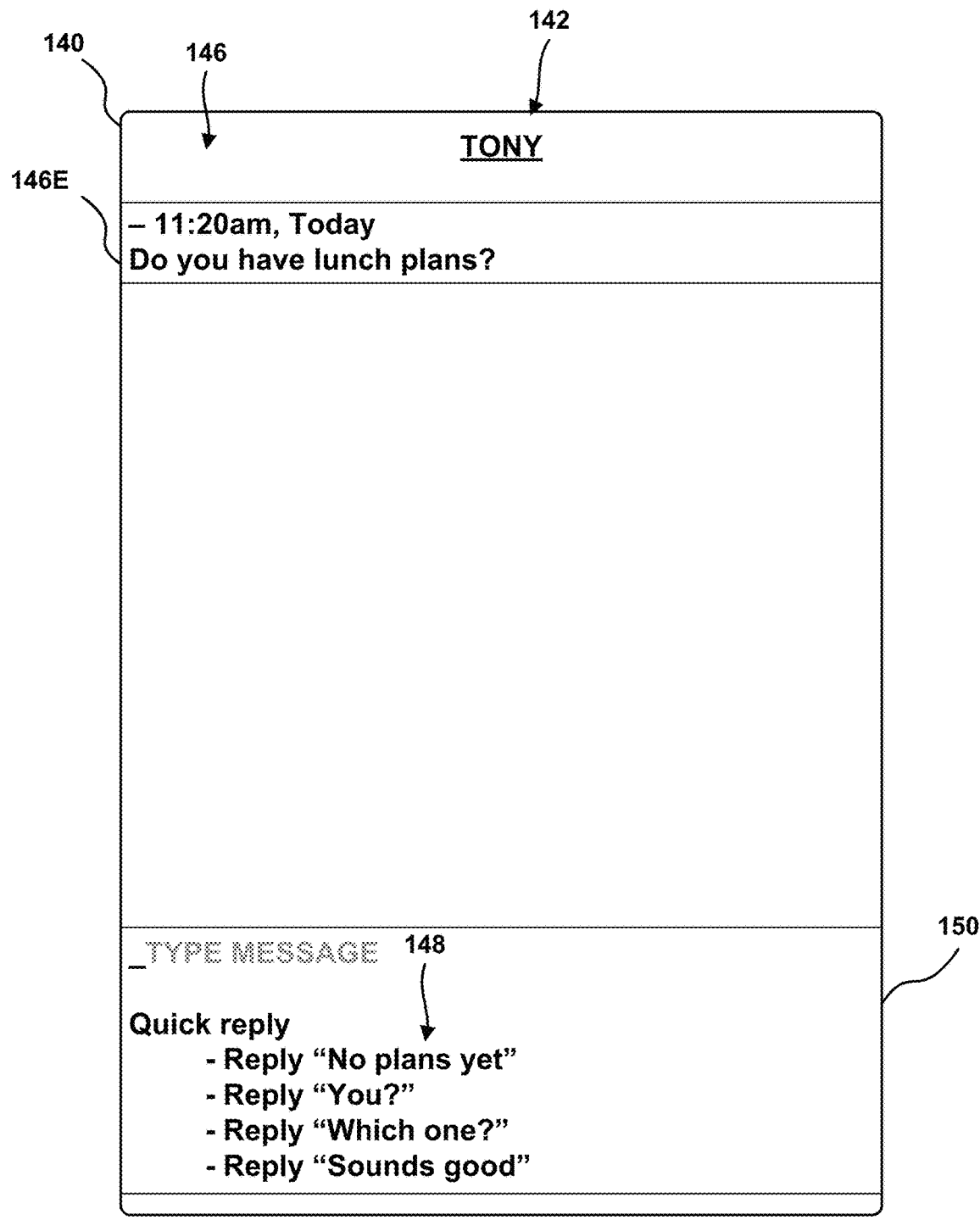
FIG. 3 is an example incoming message and reply message with selectable canned responses in a screen from a user interface, according to an embodiment.

At block 114, the computing system may provide the one or more canned responses for selection to reply to the incoming message. For instance, the computing system may initiate a display of the one or more canned responses on a graphic display. In one example, there may be many (e.g., more than 20) identified canned responses, and the computing system may select the top X (e.g., 4) phrases and provide these phrases as canned responses. Referring to FIG. 3, the computing system (e.g., the mobile device 140) may list canned responses 148 in a compose message portion 150 of a display, from which list the user may select a canned response to include in the message. The user may tap on a desired canned response (if the device 140 includes a touchscreen), say the desired response (if the device includes a microphone), look at the desired response (if the device includes eye-tracking components), or may otherwise select a desired canned response using some other input method. The user may then modify the canned response, as desired, continue drafting the message, and send the message once complete.

In the method 100, such as at block 114, the computing system may also use metrics that may help to identify the one or more canned responses. Such metrics may relate to, for example, one or more of how often a canned response is selected to reply to an incoming message or how often the canned responses are provided for selection. Other examples of metrics for assisting in the identification of relevant and personalized canned responses are also possible.

Figure 4:
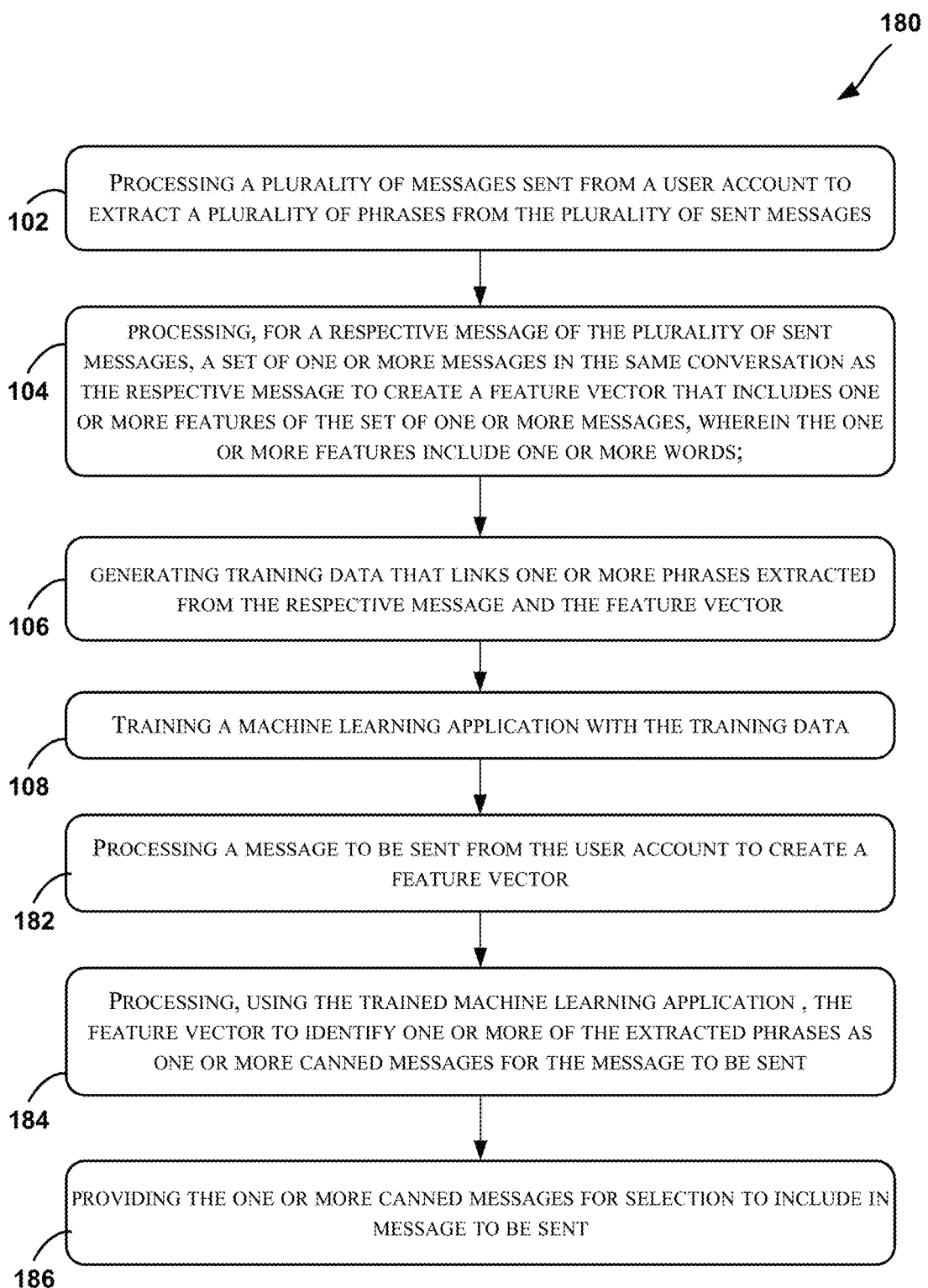
FIG. 4 is a flow chart illustrating a method, according to an embodiment.

Referring now to FIG. 4, another flow chart is illustrated of a method 180, according to an example embodiment. The method 180 includes blocks 102-108 discussed above regarding method 100. The method 180 may also include the processes of blocks 110-114 of the method 100. However, in the present example shown in FIG. 4, a block 182 follows block 108, at which the computing system may process a message to be sent from the user account to create a feature vector. In one example, the feature vector includes a feature that identifies a recipient of the message to be sent. In other examples, the feature vector may include other features, such as a time of day that the message is being composed. The computing system may also identify the recipient of the message to be sent, and then identify other messages between the user and the recipient, which are not directly linked to the present message to be sent. The computing system, at block 182, may process those other messages, as discussed above, to create the feature vector.

At block 184, the computing system uses the trained machine-learning application (block 108) to process the feature vector of the message to be sent (block 182) to identify one or more of the extracted phrases (block 102) as one or more canned messages for the message to be sent. Generally, the machine-learning application maps particular phrases with the feature vector of the message to be sent (which may include a recipient ID, a time of day, voice call information from the recipient, and the like) to identify the phrases that may be most relevant as potential messages to be sent to the recipient. At block 184, the computing system may rank the identified phrases in order of most relevant or as most probable messages to include in the message to be sent.

Figure 5:
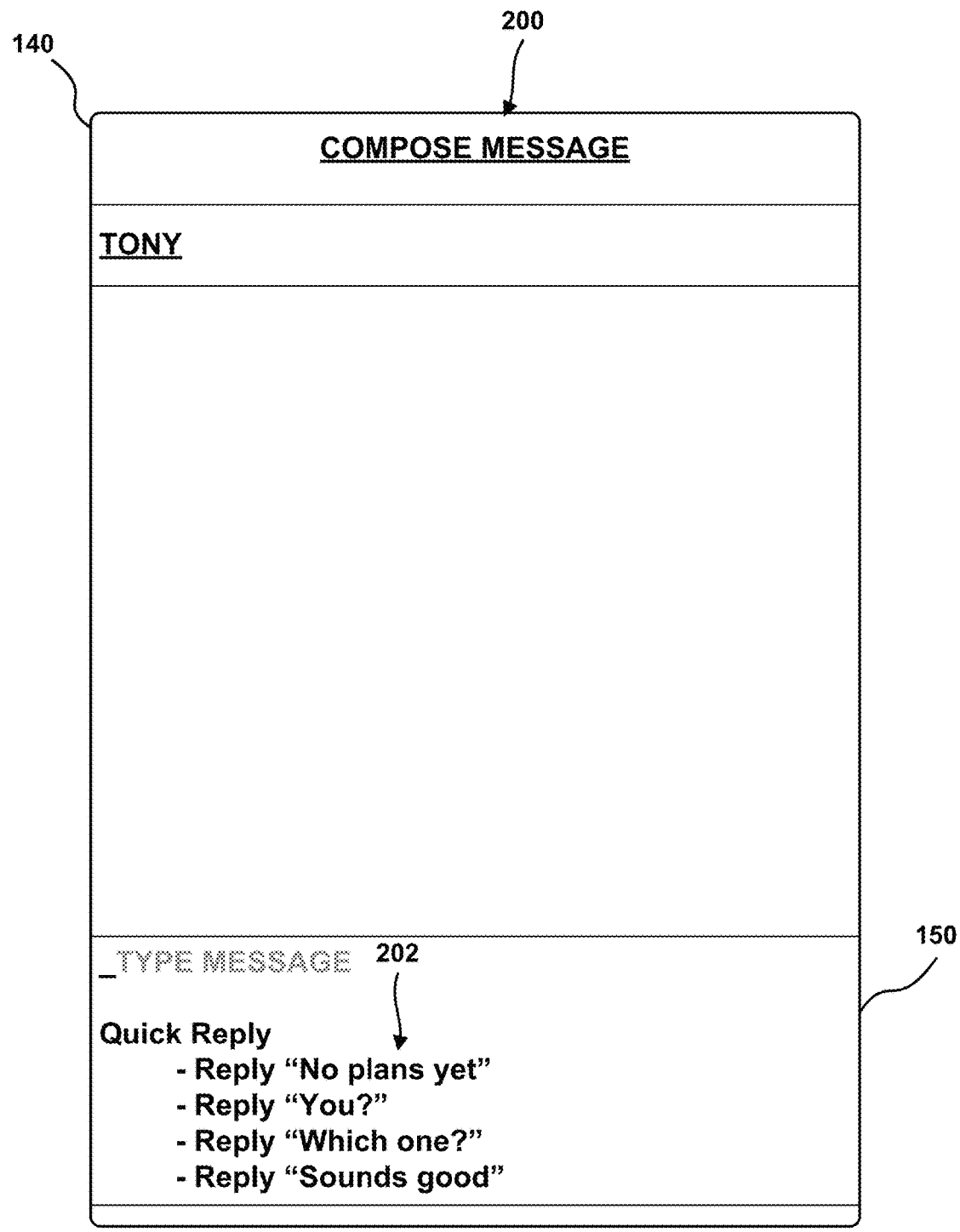
FIG. 5 is an example compose message interface with selectable canned messages in a screen from a user interface, according to an embodiment.

At block 186, the computing system may provide the one or more canned messages for selection to include in the message to be sent. For instance, the computing system may initiate a display of the one or more canned messages on a graphic display. In one example, there may be many (e.g., more than 20) identified canned messages, and the computing system may select the top X (e.g., 4) phrases and provide these phrases as canned messages. Referring to FIG. 5, the computing system (e.g., the mobile device 140) may list canned messages 202 in a compose message portion 150 of a display, from which list the user may select a canned message to include in the message. The user may tap on a desired canned message (if the device 140 includes a touch-screen), say the desired message (if the device includes a microphone), look at the desired message (if the device includes eye-tracking components), or may otherwise select a desired canned message using some other input method. The user may then modify the canned message, as desired, continue drafting the message, and send the message once complete.

In the method 200, such as at block 184, the computing system may also use metrics that may help to identify the one or more canned messages. Such metrics may relate to, for example, one or more of how often a canned message is selected to reply to include in an outgoing message or how often the canned messages are provided for selection. Other examples of metrics for assisting in the identification of relevant and personalized canned messages are also possible.

Example Computing Systems

In general, an example computing system may be implemented in or may take the form of a server system or a component thereof. For instance, an example system may take the form of non-transitory computer readable medium, which has program instructions stored thereon that are executable by at a processor to provide the functionality described herein. An example system may also take the form of a computing device itself, a subsystem of such a device, or a combination of multiple computing devices, which include a non-transitory computer readable medium having such program instructions stored thereon.

Figure 6:
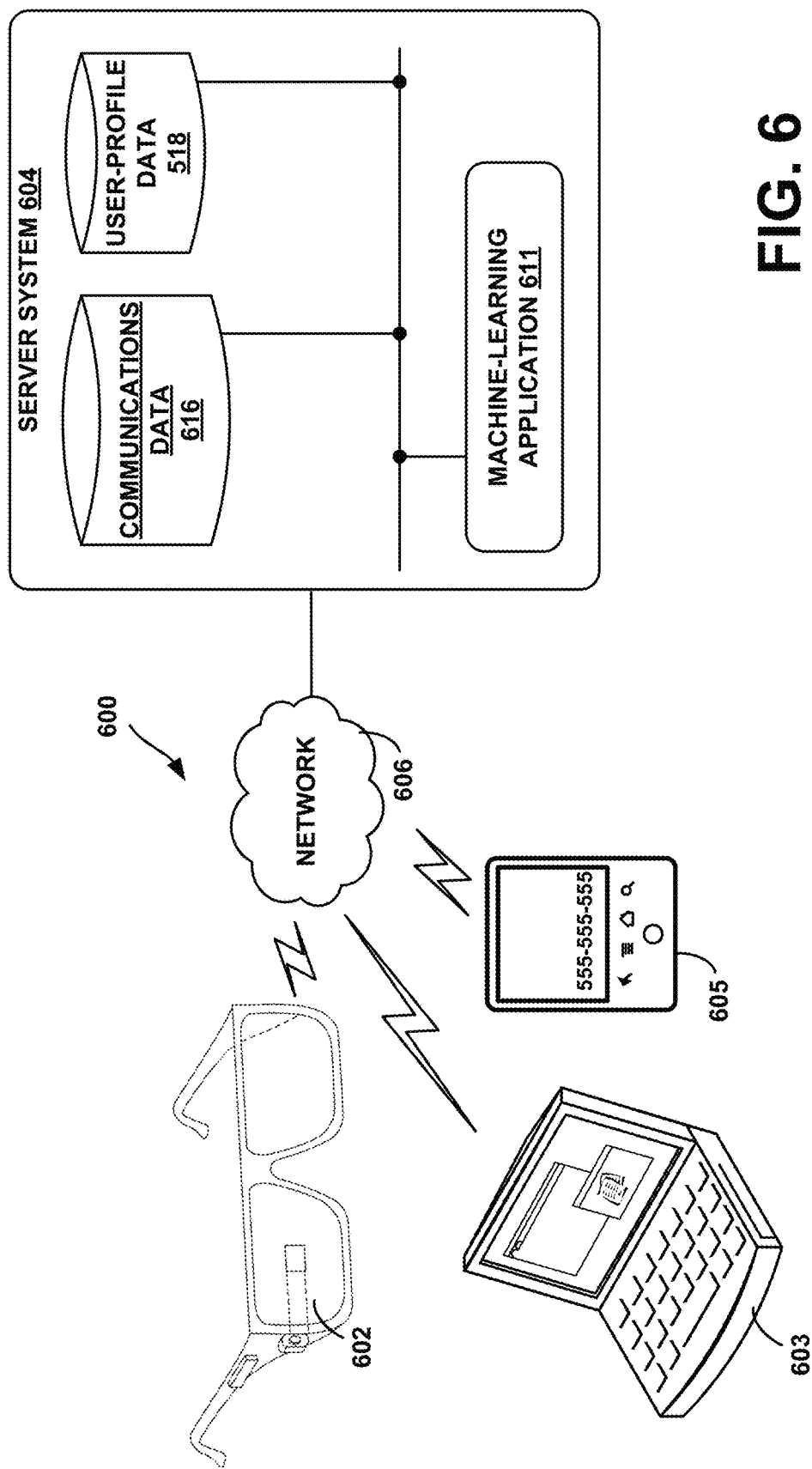
FIG. 6 is a simplified block diagram illustrating a computing system, according to an embodiment.

FIG. 6 is a simplified block diagram illustrating a communication network via which messages associated with a user account can be processed and canned messages can be provided for insertion in a reply or new message, according to an embodiment. As shown, communication network 600 includes a number of computing devices (e.g., wearable computing device or HMD 602, laptop computer 603, and mobile device 605), which are configured to communicate with a server system 604 via one or more networks 606. As such, server system 604 may be configured to receive communications associated with a user account (e.g., SMS messages, emails, instant messages (IMs), personal messages (PMs), voice communications, and the like). The server system 606 may then utilize the communications to carry out functions of a method, such as methods 100, 180, to provide smart canned responses/messages, as described above.

In order to facilitate an example method, the users of the computing devices 602, 603, 605 may register their respective devices and opt in to programs via which the users of these devices authorize the server to system 604 to process the communications to provide the smart canned responses/messages.

The server system 604 may be a computing system including one or more computing devices. In particular, server system 604 may be a cloud-based server system that is configured for server-system functions described herein. In the illustrated example, server system 604 may include or be in communication with a machine-learning application 611, which is configured for various machine-learning functions, as described herein.

In some embodiments, the machine-learning application 611 may take the form of or include software, hardware, and/or firmware for providing the functionality described herein. In particular, the machine-learning application 611 may include program instructions stored in a tangible computer-readable medium that are executable to provide the functionality described herein, and possibly to provide other functionality as well.

Further, the machine-learning application 611 may be a subsystem of a computing device, a computing device unto itself, or may be a system that includes one or more computing devices. For instance, the machine-learning application 611 may be a separate server system, which includes one or more computing devices. Alternatively, some or all of the functionality attributed to the machine-learning application 611 may be provided by a combined server system, which may include one or more computing devices. Further, other types and combinations of hardware, software, and/or firmware may provide some or all of the functionality of the machine-learning application 611, without departing from the scope of the disclosure. Other variations on the illustrated arrangement of components are also possible.

In a further aspect, server system 604 may include or have access to various databases including data that may be utilized to provide the functionality described herein. In the illustrated example, server system 604 includes a communications database 616 and a user-profile database 618. Other databases are also possible.

Further, note that while communications database 616 and user-profile database 618 are shown as separate databases, some or all of the data described as being stored in communications database 616 and/or user-profile database 618 may be combined in a common database or in various other arrangements of databases. Additionally or alternatively, communications database 616 and/or user-profile database 618 may each be implemented by multiple databases. Yet further, while communications database 616 and user-profile database 618 are illustrated as components of server system 604, some or all of these databases may be included in a separate computing system or systems that are accessible to server system 618. Other variations on the illustrated arrangement of databases are also possible.

Communications database 616 may include data identifying and/or describing text communications and voice communications associated with a user account. The communications database 606 may also include feature vectors, phrases, training data, and other data that can be used by the machine learning application 611 to perform the functions described herein.

Yet further, in order to determine the canned responses/ messages, user-profile database 618 may include user-profile data for a number of users, may provide access to other sources of data related to users, and/or may indicate other storage locations for data related to users. The user-profile data stored in or accessible via user-profile database 618 may therefore be helpful in determining relevant and personalized canned responses/messages that can be suggested to a user when composing a message.

In FIG. 6, communications between the various devices 602, 603, 605 the server system 604 are illustrated as being conducted via wireless connections; however, wired connections may additionally or alternatively be used. For example, an example embodiment may conduct wired communications via a wired serial bus such as a universal serial bus or a parallel bus, or via another type of wired connection. A wired connection may be a proprietary connection as well. Further, wireless communications may utilize various different types of wireless connections and protocols such as Bluetooth® radio technology, communication protocols described in IEEE 802.11 (including any IEEE 802.11 revisions), cellular technology (such as GSM, CDMA, UMTS, EV-DO, WiMAX, or LTE), and/or Zigbee technology, among other possibilities.

It should be understood that the arrangements shown in FIG. 6 and described herein are provided for illustrative purposes, and are not intended to be limiting. Those skilled in the art will understand that variation on the illustrated arrangement and other arrangements are possible, without departing from the scope of the disclosure.

Wearable Computing Devices

Figure 7A:
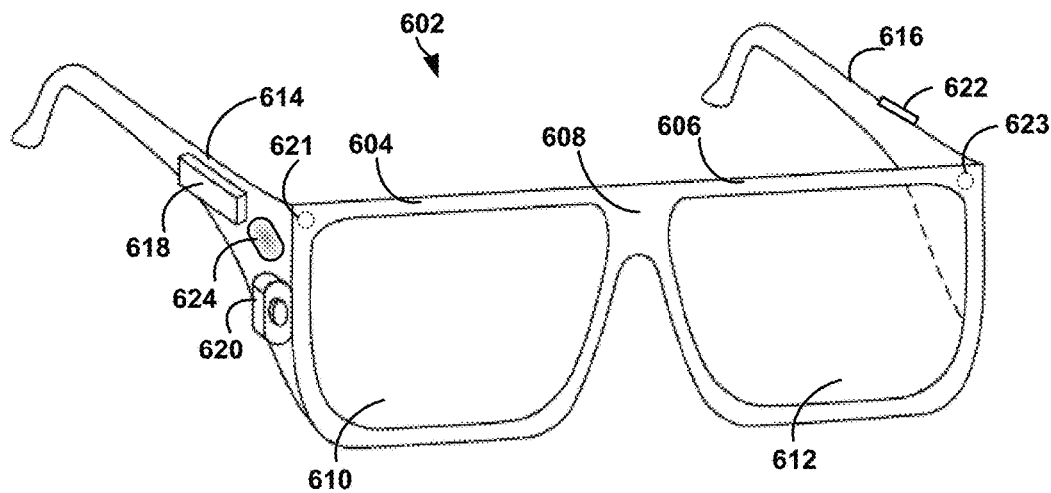
FIG. 7A illustrates a wearable computing system, according to an embodiment.

FIG. 7A illustrates a wearable computing system according to an embodiment. In FIG. 7A, the wearable computing system takes the form of a head-mountable device (HMD) 602 (which may also be referred to as a head-mountable display). It should be understood, however, that systems and devices may take the form of or be implemented within or in association with other types of devices, without departing from the scope of the disclosure. As illustrated in FIG. 7A, the head-mountable device 602 comprises frame elements including lens-frames 604, 606 and a center frame support 608, lens elements 610, 612, and extending side-arms 614, 616. The center frame support 608 and the extending side-arms 614, 616 are configured to secure the head-mountable device 602 to a user's face via a user's nose and ears, respectively.

Each of the frame elements 604, 606, and 608 and the extending side-arms 614, 616 may be formed of a solid structure of plastic and/or metal, or may be formed of a hollow structure of similar material so as to allow wiring and component interconnects to be internally routed through the head-mountable device 602. Other materials may be possible as well.

One or more of each of the lens elements 610, 612 may be formed of any material that can suitably display a projected image or graphic. Each of the lens elements 610, 612 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 614, 616 may each be projections that extend away from the lens-frames 604, 606, respectively, and may be positioned behind a user's ears to secure the head-mountable device 602 to the user. The extending side-arms 614, 616 may further secure the head-mountable device 602 to the user by extending around a rear portion of the user's head. Additionally or alternatively, for example, the HMD 602 may connect to or be affixed within a head-mountable helmet structure. Other possibilities exist as well.

The HMD 602 may also include an on-board computing system 618, a video camera 620, a sensor 622, and a finger-operable touch pad 624. The on-board computing system 618 is shown to be positioned on the extending side-arm 614 of the head-mountable device 602; however, the on-board computing system 618 may be provided on other parts of the head-mountable device 602 or may be positioned remote from the head-mountable device 602 (e.g., the on-board computing system 618 could be wire- or wirelessly-connected to the head-mountable device 602). The on-board computing system 618 may include a processor and memory, for example. The on-board computing system 618 may be configured to receive and analyze data from the video camera 620 and the finger-operable touch pad 624 (and possibly from other sensory devices, user interfaces, or both) and generate images for output by the lens elements 610 and 612.

The video camera 620 is shown positioned on the extending side-arm 614 of the head-mountable device 602; however, the video camera 620 may be provided on other parts of the head-mountable device 602. The video camera 620 may be configured to capture images at various resolutions or at different frame rates. Many video cameras with a small form-factor, such as those used in cell phones or webcams, for example, may be incorporated into an example of the HMD 602.

Further, although FIG. 7A illustrates one video camera 620, more video cameras may be used, and each may be configured to capture the same view, or to capture different views. For example, the video camera 620 may be forward facing to capture at least a portion of the real-world view perceived by the user. This forward facing image captured by the video camera 620 may then be used to generate an augmented reality where computer generated images appear to interact with the real-world view perceived by the user.

Yet further, system 600 may include an inward-facing camera 621, which is configured to capture video of the wearer's eye for various purposes, such detecting a wearer's eye movements. Such an inward-facing camera could be built into the frame of eyeglasses 602, built into lens elements 610 and 612 outside of a display area, or built into a display area of lens elements 610 and 612.

System 600 may additionally or alternatively use other types of sensors 623 to detect a wearer's eye movements, in addition to or in the alternative to an in inward-facing camera 621. For example, system 600 could incorporate a proximity sensor or sensors 623, which may be used to measure distance using infrared reflectance. Most cell phones have one of these to determine when you hold the phone against your head. As is well known in the art, the eye has useful properties in infrared, and thus an infrared sensor may be used to track basic eye movements (e.g., pupil movements and/or blinks). In one such embodiment, lens element 610 and/or 612 could include a number of LEDs which are each co-located with an infrared receiver, to detect when a user looks at a particular LED. As such, eye movements between LED locations may be detected. Other examples are also possible.

The sensor 622 is shown on the extending side-arm 616 of the head-mountable device 602; however, the sensor 622 may be positioned on other parts of the head-mountable device 602. The sensor 622 may include one or more of a gyroscope or an accelerometer, for example. In another example, the sensor 622 may include a microphone, which can be configured to allow a user to make calls using the device 602 and/or to provide voice command inputs. Other sensing devices may be included within, or in addition to, the sensor 622 or other sensing functions may be performed by the sensor 622.

The finger-operable touch pad 624 is shown on the extending side-arm 614 of the head-mountable device 602. However, the finger-operable touch pad 624 may be positioned on other parts of the head-mountable device 602. Also, more than one finger-operable touch pad may be present on the head-mountable device 602. The finger-operable touch pad 624 may be used by a user to input commands. The finger-operable touch pad 624 may sense at least one of a position and a movement of a finger via capacitive sensing, resistance sensing, or a surface acoustic wave process, among other possibilities. The finger-operable touch pad 624 may be capable of sensing finger movement in a direction parallel or planar to the pad surface, in a direction normal to the pad surface, or both, and may also be capable of sensing a level of pressure applied to the pad surface. The finger-operable touch pad 624 may be formed of one or more translucent or transparent insulating layers and one or more translucent or transparent conducting layers. Edges of the finger-operable touch pad 624 may be formed to have a raised, indented, or roughened surface, so as to provide tactile feedback to a user when the user's finger reaches the edge, or other area, of the finger-operable touch pad 624. If more than one finger-operable touch pad is present, each finger-operable touch pad may be operated independently, and may provide a different function.

Figure 7B:
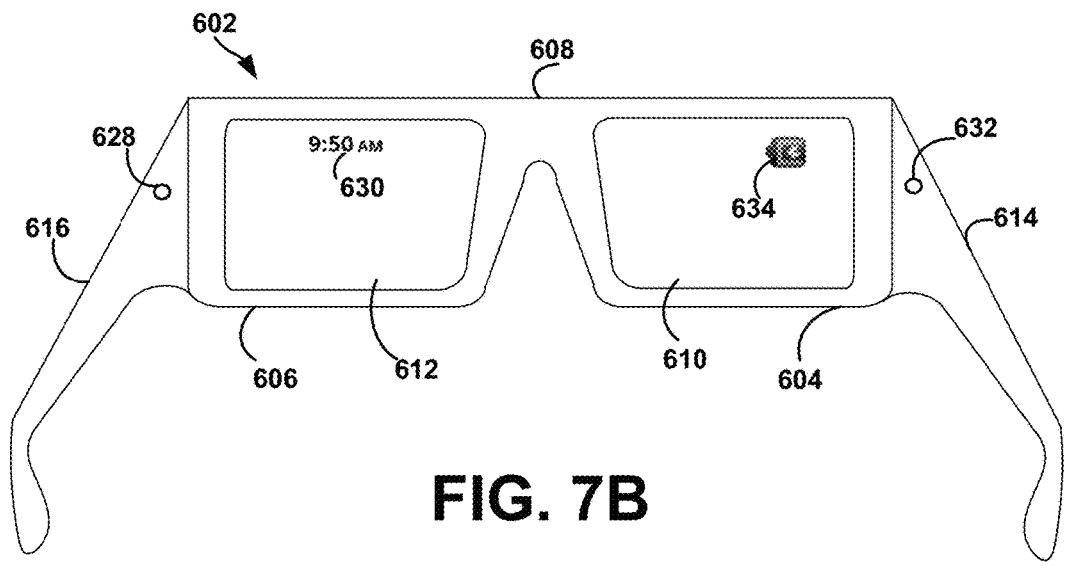
FIG. 7B illustrates an alternate view of the wearable computing device illustrated in FIG. 7A.

FIG. 7B illustrates an alternate view of the wearable computing device illustrated in FIG. 7A. As shown in FIG. 7B, the lens elements 610, 612 may act as display elements. The head-mountable device 602 may include a first projector 628 coupled to an inside surface of the extending side-arm 616 and configured to project a display 630 onto an inside surface of the lens element 612. Additionally or alternatively, a second projector 632 may be coupled to an inside surface of the extending side-arm 614 and configured to project a display 634 onto an inside surface of the lens element 610.

The lens elements 610, 612 may act as a combiner in a light projection system and may include a coating that reflects the light projected onto them from the projectors 628, 632. In some embodiments, a reflective coating may not be used (e.g., when the projectors 628, 632 are scanning laser devices).

In alternative embodiments, other types of display elements may also be used. For example, the lens elements 610, 612 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 604, 606 for driving such a matrix display. Alternatively or additionally, a laser or LED source and scanning system could be used to draw a raster display directly onto the retina of one or more of the user's eyes. Other possibilities exist as well.

Figure 7C:
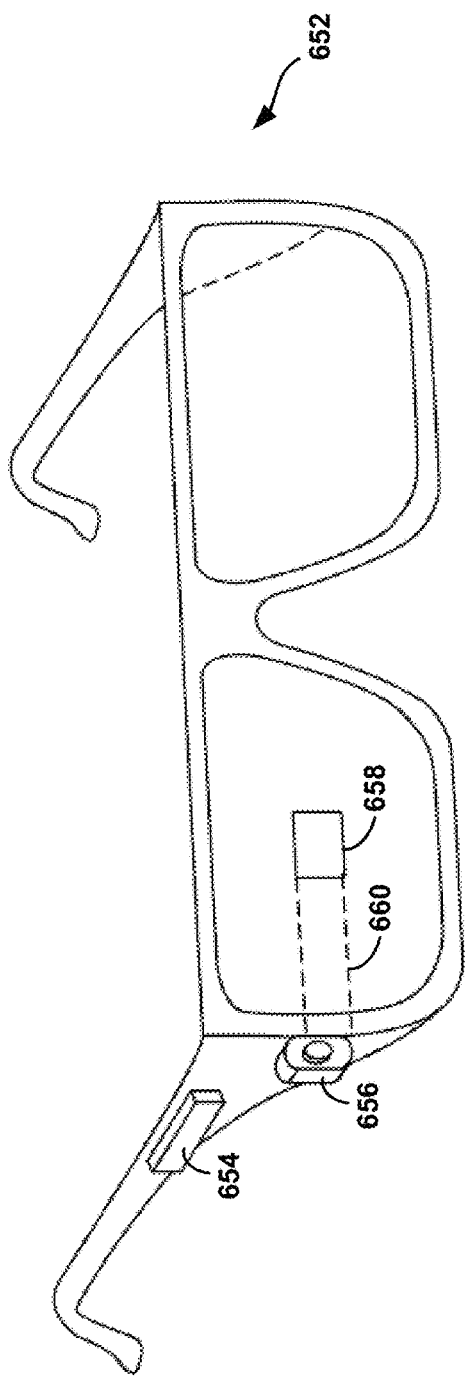
FIG. 7C illustrates another wearable computing system according to an embodiment.

FIG. 7C illustrates another wearable computing system according to an embodiment, which takes the form of an HMD 652. The HMD 652 may include frame elements and side-arms such as those described with respect to FIGS. 7A and 7B. The HMD 652 may additionally include an on-board computing system 654 and a video camera 656, such as those described with respect to FIGS. 7A and 7B. The video camera 656 is shown mounted on a frame of the HMD 652. However, the video camera 656 may be mounted at other positions as well.

As shown in FIG. 7C, the HMD 652 may include a single display element 658 which may be embedded in the lens element and coupled to the device. The display element 658 may be formed on one of the lens elements of the HMD 652, such as a lens element described with respect to FIGS. 7A and 7B, and may be configured to overlay computer-generated graphics in the user's view of the physical world. The display element 658 is shown to be provided in a center of a lens of the HMD 652; however, the display element 658 may be provided in other positions.

The display element 658 may be implemented in various ways. For example, display element 658 is illustrated as being an optical see-through display, which is controllable via the computing system 654 that is coupled to the display element 658 via an optical waveguide 660. Other types of optical see-through displays are also possible. Further, an HMD may implement other types of near-eye displays, such as a video see-through display or an optical see-around display, without departing from the scope of the disclosure.

Figure 7D:
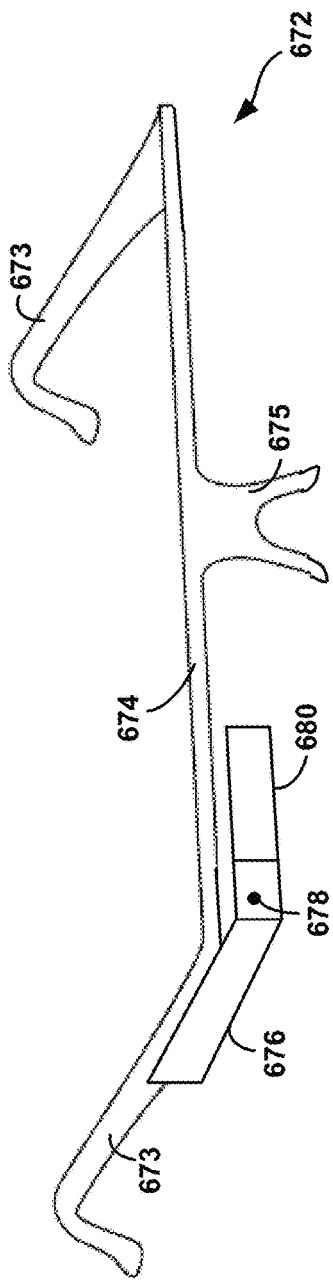
FIG. 7D illustrates another wearable computing system according to an embodiment.

FIG. 7D illustrates another wearable computing system according to an embodiment, which takes the form of an HMD 672. The HMD 672 may include side-arms 673, a center frame support 674, and a bridge portion with nosepiece 675. In the example shown in FIG. 7D, the center frame support 674 connects the side-arms 673. The HMD 672 does not include lens-frames containing lens elements. The HMD 672 may additionally include an on-board computing system 676 and a video camera 678, such as those described with respect to FIGS. 7A and 7B.

The HMD 672 may include a single display element 680 that may be coupled to one of the side-arms 673 or the center frame support 674. The display element 680 may be configured in a similar manner as described with reference to FIG. 7C, and may be configured to overlay computer-generated graphics upon the user's view of the physical world. In one example, the single display element 680 may be coupled to the inner side (i.e., the side exposed to a portion of a user's head when worn by the user) of the extending side-arm 673. The single display element 680 may be positioned in front of or proximate to a user's eye when the HMD 672 is worn by a user. For example, the single display element 680 may be positioned below the center frame support 674, as shown in FIG. 6D.

Figure 8:
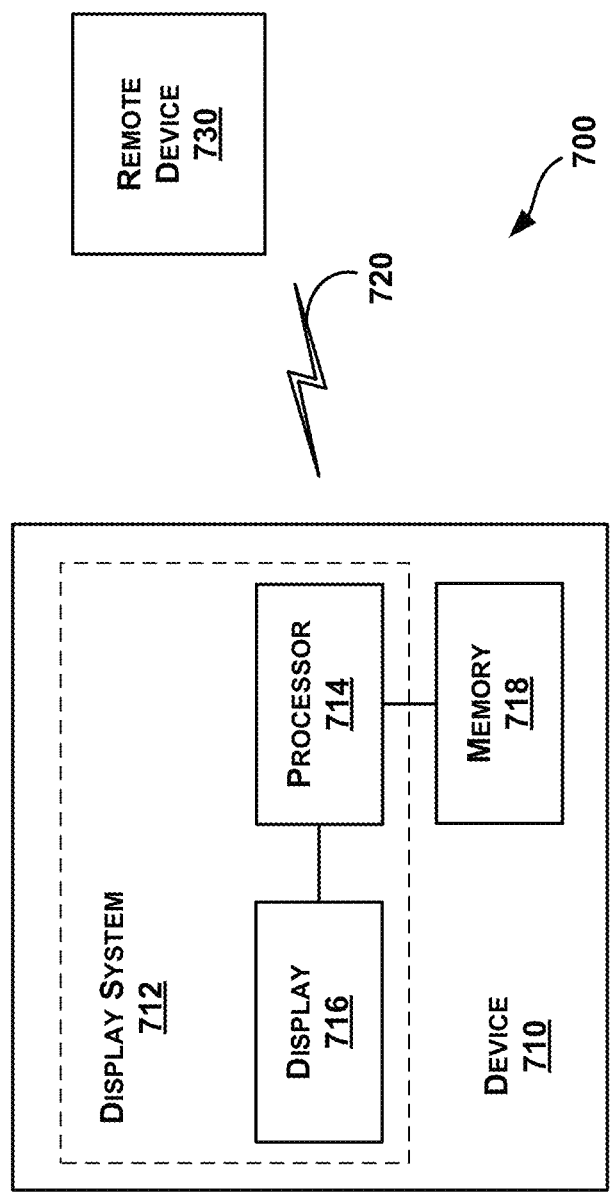
FIG. 8 illustrates a schematic drawing of a computing device according to an embodiment.

FIG. 8 illustrates a schematic drawing of a computing device according to an embodiment. In system 700, a device 710 communicates using a communication link 720 (e.g., a wired or wireless connection) to a remote device 730. The device 710 may be any type of device that can receive data and display information corresponding to or associated with the data. For example, the device 710 may be a heads-up display system, such as the head-mountable devices 602, 652, or 672 described with reference to FIGS. 6A-6D.

Thus, the device 710 may include a display system 712 comprising a processor 714 and a display 716. The display 710 may be, for example, an optical see-through display, an optical see-around display, or a video see-through display. The processor 714 may receive data from the remote device 730, and configure the data for display on the display 716. The processor 714 may be any type of processor, such as a micro-processor or a digital signal processor, for example.

The device 710 may further include on-board data storage, such as memory 718 coupled to the processor 714. The memory 718 may store software that can be accessed and executed by the processor 714, for example.

The remote device 730 may be any type of computing device or transmitter including a laptop computer, a mobile telephone, or tablet computing device, etc., that is configured to transmit data to the device 710. The remote device 730 and the device 710 may contain hardware to enable the communication link 720, such as processors, transmitters, receivers, antennas, etc.

In FIG. 8, the communication link 720 is illustrated as a wireless connection; however, wired connections may also be used. For example, the communication link 720 may be a wired serial bus such as a universal serial bus or a parallel bus. A wired connection may be a proprietary connection as well. The communication link 720 may also be a wireless connection using, e.g., Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. The remote device 730 may be accessible via the Internet and may include a computing cluster associated with a particular web service (e.g., social-networking, photo sharing, address book, etc.).

An Example User Interface for a Computing Device

Many example graphical user interfaces (GUIs) provide information and/or allow for user interaction in two dimensions. The two dimensions can be identified as the X dimension and the Y dimension, where the X dimension is for horizontal or left-right movement, and Y dimension is for vertical or up-down movement.

For example, a GUI for an HMD or other computing device may include a two-dimensional timeline feature that allows the wearer to navigate through a sequence of ordered images arranged along an X-axis representing time. In the context of such a timeline feature, each image may be referred to as a "card." Among the sequence of cards, one or more cards can be displayed, and of the displayed card(s), one card can be "focused on" for possible selection.

In some scenarios, a timeline can be displayed as a one-dimensional array of cards organized by time (e.g., a row of cards with time increasing as cards progress from left to right across the display). In some examples, the timeline can present a single-card view with one card displayed, with the card being both displayed and focused upon.

In some scenarios, a large number of cards can be available for display and other uses by the computing device. For example, cards can accumulate over time as a wearer uses the HMD on a regular basis. As another example, the wearer may generate a number of cards related to some activity or event (e.g., cards representing images/videos of a first child, vacation images, videos, and messages, messages and other media related to coordinating a work-related conference/meeting). To interact with the large number of cards, the UI of the HMD can generate and utilize multi-card displays where multiple cards are visible at the same time. The UI can permit operations for selecting a card to work within the multi-card display, working with cards (e.g., sharing cards, editing cards, and deleting cards), reviewing cards not shown within the multi-card display, and switching between single-card and multi-card displays. In particular examples, multiple cards can be displayed in a multi-card view until a card is selected; then the selected card can be displayed using a single-card view that occupies substantially all of the viewing area of the display. Many other operations related to multi-card displays are possible as well.

A multi-card display can, for example, be a one-dimensional view or a two-dimensional (2D) view. A one-dimensional multi-card display can show cards in a row or column, permit navigation or movement among the cards by moving left and right along the row or up and down the column, enable selection of a card, and then indicate operations for working with a selected card.

A two-dimensional view can display cards using various display techniques. Specific two-dimensional views can include a multi-timeline view, among other possibilities. The multi-timeline view can display multiple timelines of cards, where each timeline of cards can include cards selected and/or arranged by the criteria indicated for grid view selection and perhaps for additional and/or differing criteria. Each timeline can be a one-dimensional array (e.g., a row or column, of cards to be displayed).

Groups of cards that represent a same type of object can be collected into a "bundle." For example, a collection of photos captured within a certain span of time can be represented as a photo bundle. As another example, a collection of messages (e.g. an instant messaging session, SMS/text-message exchange, or e-mail chain) can be represented as a message bundle. A "bundle card" can be constructed for display on the timeline that represents the bundle and, in some cases, summarizes the bundle (e.g., shows thumbnail photos of photos in a photo bundle or excerpts of messages in a message bundle).

In the multi-timeline view, timelines can be added and/or deleted based on navigation, or wearer-selected movements and card selections. For example, a wearer can select a bundle card and, upon bundle card selection in the multi-timeline view, some or all of the cards represented by the bundle card can be displayed in a new timeline of cards. As another example, a card representing a photo can be selected by the wearer. Upon selection of the photo card, a "menu", or group of "action cards" that represent actions that can be performed by the HMD. Action cards can include actions specifically related to the photo card (e.g., share the photo, edit the photo, delete the photo, etc.). In another example, a card representing a message can be selected by the wearer. Upon selection of the message card, a "menu," or group of "action cards" that represent actions that can be performed by the HMD. Action cards can include actions specifically related to the message card (e.g., reply to the message using a voice-to-text application, reply to the message using a canned response application, forward the message, delete the message, and the like.) A menu of action cards can be displayed in a linear arrangement such as utilized by any other timeline; in these embodiments, the term menu can describe a timeline that includes only action cards.

Using two-dimensional views of card can increase the number of cards a wearer can observe at one time, making use of the user interface more efficient. Also by viewing multiple cards simultaneously in two dimensions, the wearer may be able to better utilize the computing device. Displaying cards in grid views can be an intuitive technique for displaying multiple cards. And the use of multi-timeline views can provide interesting arrangements of cards and enable ready review and selection of actions associated with a selected card.

Figure 9:
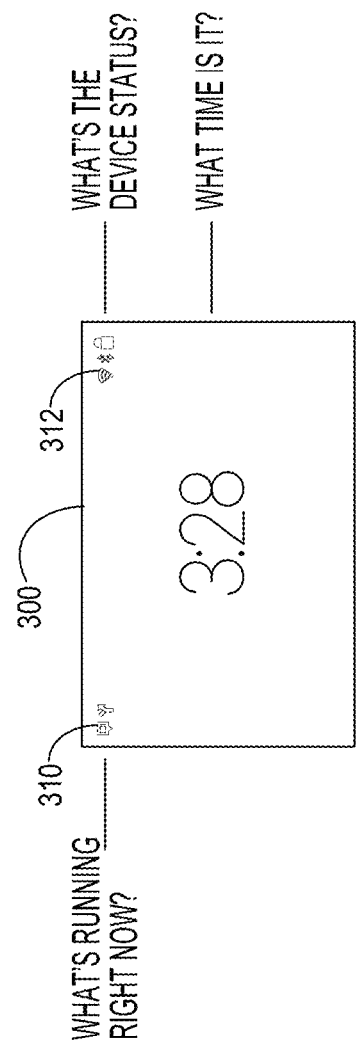
FIG. 9 shows an example home card of an example user interface for a HMD, according to an embodiment.
Figure 11:
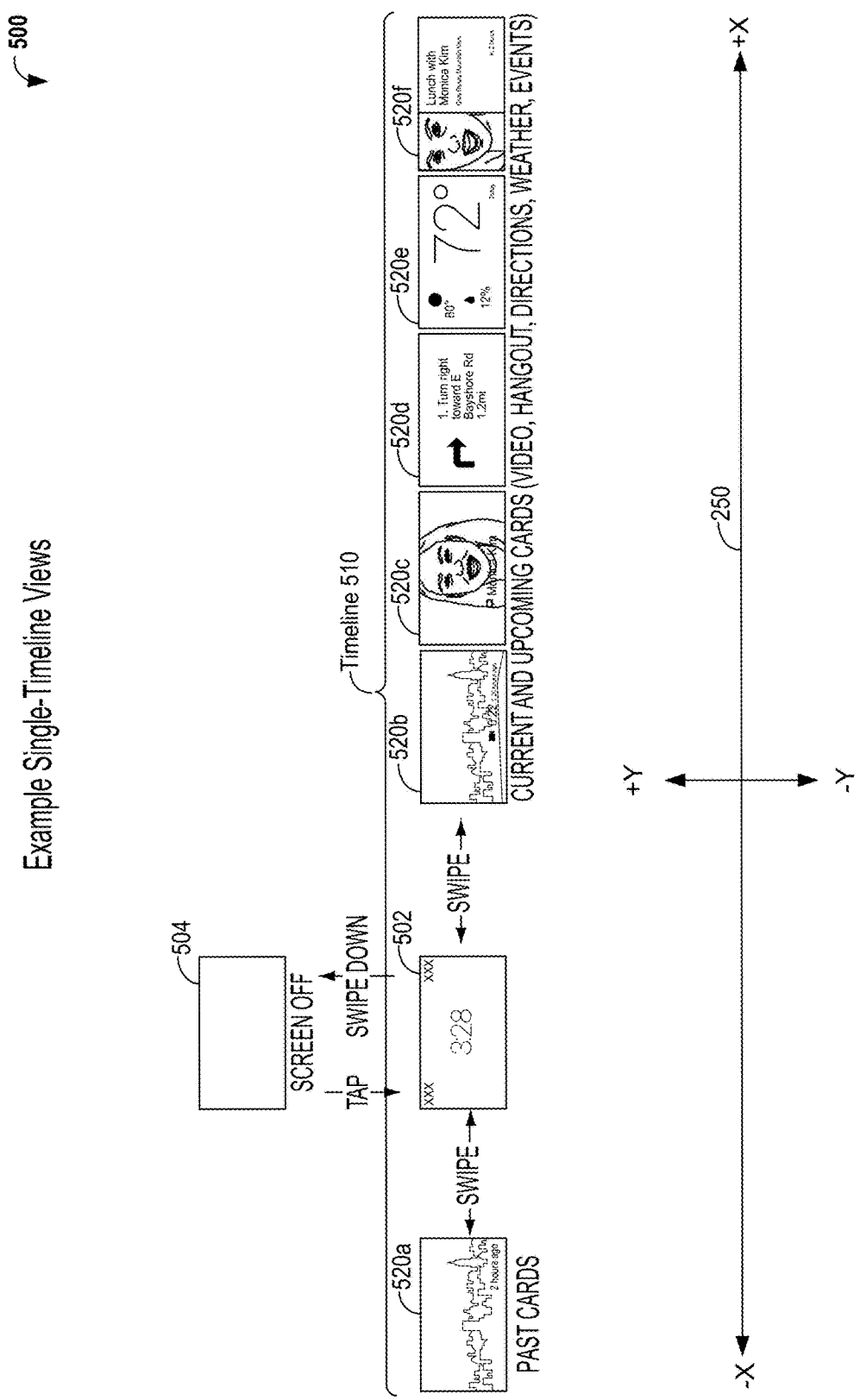
FIG. 11 shows a scenario of example of interactions with a single timeline of cards, according to an embodiment.

FIGS. 9-11 collectively describe aspects of an example user interface for a computing device, such as the HMD discussed above at least in the context of FIGS. 7A-7D. The computing device can be configured with a UI controller receiving inputs from at least a touch-based UI. The touch-based UI can include one or more hand-movement input devices that are configured to receive various hand movements, such as one-finger swipes in various directions, two-finger or multi-finger swipes in various directions, taps, button presses of various durations, and button releases, and generate corresponding hand-movement data. In some embodiments, the one or more hand-movement input devices can be one or more of the hand-movement input devices discussed above in the context of FIG. 7A. In particular embodiments, the one or more hand-movement input devices can include a touchpad, such as touchpad 624, and a button. In some embodiments, the computing device can utilize a voice-based UI as well.

Once a touch is received, the touch-based UI can report the touch (e.g., a "swipe forward" or "tap" to the computing device, or in some cases, to a component of the computing device such as a UI controller). In other embodiments, the HMD can act as the UI controller. As described herein, the computing device includes any necessary components, such as but not limited to one or more UI controllers, which are configured to perform and control the UI operations described herein.

The computing device can generate cards that can occupy the full display of the computing device when selected. One card is a home card that is the first card displayed when the UI is activated, for example, shortly after the computing device powers up or when the computing device wakes from a sleep or power-saving mode. FIG. 9 shows an example home card 300 of an example UI, according to an example embodiment. Home card 300 includes application status indicators 310, device status indicators 312, hint 316 and a clock shown in large numerals indicating the current time in the center of home card 300. Application status indicators 310 can indicate which application(s) are operating on the computing device. As shown in FIG. 9, application status indicators 310 include camera and Y-shaped road icons to respectively indicate operation of a camera application and a navigation application. Such indicators can remind the wearer what applications or processes are presently running and/or consuming power and/or processor resources of the computing device.

Device status indicators 312 can indicate which device(s) are operating on the computing device and status for an HMD acting as the computing device. As shown in FIG. 9, device status indicators 312 include icons for a wireless network and a Bluetooth network that indicate the HMD is presently configured for communication via a wireless network and/or a Bluetooth network, respectively. In one embodiment, the HMD may not present device status indicators 312 on home card 300.

The UI can accept as inputs certain UI operations performed using the touch-based UI. The UI can receive these UI operations and responsively perform actions to enable the wearer to interact with the computing device. These UI operations can be organized into tiers. FIG. 10 lists example UI operations in multi-tiered user model 400 for the computing device, according to an example embodiment.

As shown in FIG. 10, multi-tiered user model 400 has three tiers: basic, intermediate, and advanced. The basic tier provides the smallest number of UI operations of any tier of multi-tiered user model 400. The intermediate tier includes all UI operations provided by the basic tier, along with additional operations not provided by the basic tier. Similarly, the advanced tier includes all UI operations provided by the basic and intermediate tiers, along with additional operations not provided by either the basic tier or intermediate tier.

FIG. 10 shows that the basic tier of multi-tiered user model 400 provides tap, swipe forward, swipe backward, voice, and camera button press operations. A tap operation can involve a single physical tap—that is, one quick, slight strike with one or more fingers on a touchpad of the touch-based UI. A swipe forward operation, sometimes termed a swipe away or a swipe right, can involve a swipe in a general −Z direction (e.g., the direction from the wearer's ear toward the wearer's eye when the wearer has an HMD acting as the computing device on). A swipe backward operation, sometimes termed a swipe left or swipe toward, can involve a swipe in a general +Z direction (e.g., the direction from the wearer's eye toward the wearer's ear when the wearer has the HMD on). A swipe down operation can involve a downward swipe, where downward is the general direction from the top of the wearer's head toward the wearer's neck when the wearer has the HMD on (e.g., a −Y direction in the device coordinate system).

While example embodiments in this description make reference to particular directions of touchpad input such as up, down, left, right, it should be understood that these are examples and that embodiments where certain operations may be triggered via different input directions are contemplated.

In one embodiment, the physical actions used by the wearer to perform some or all of the herein-described operations can be customized (e.g., by the wearer and/or other entity associated with the HMD). For example, suppose the wearer prefers to perform a physical action of a double-tap—that is, one physical tap quickly followed by a second physical tap—rather than the above-mentioned single physical tap, to perform a tap operation. In this embodiment, the wearer and/or other entity could configure the HMD to recognize a double-tap as a tap operation, such as by training or setting the HMD to associate the double-tap with the tap operation. As another example, suppose that the wearer would like to interchange the physical operations to perform swipe forward and backward operations (e.g., the swipe away operation would be performed using a physical action described above as a swipe left, and the swipe toward operation would be performed using a physical action described above as a swipe right). In this embodiment, the wearer could configure the HMD to recognize a physical swipe left as a swipe away operation and physical swipe right as a swipe toward operation. Other customizations are possible as well (e.g., using a sequence of swipes to carry out the tap operation).

The tap operation can select a currently visible card. The swipe away operation can remove the currently visible card from display and select a next card for display. The swipe toward operation can remove the currently visible card from display and select a previous card for display. In other contexts, such as in the context of a Z-axis oriented display, a swipe toward and a swipe away can have different effects, such as, respectively zooming in or zooming out on an image or timeline, increasing or decreasing a settings value, or respectively causing a message to be answered or rejected.

The swipe down operation can, depending on context, act to go back, go home, or sleep. Going back can remove the currently visible card from display and display a previously-visible card for display. For example, the previously-visible card can be the card that was most recently prior to a currently visible card (e.g., if card A is currently visible and card B is the recently prior currently visible card, then the swipe down operation can remove card A from visibility and display card B). Going home can replace the currently visible card and display the home card. Sleeping can cause part (e.g., the display) or all of the HMD to be deactivated.

In some embodiments, a voice operation can provide access to a voice menu of operations. In other embodiments, a camera button press can instruct the HMD to take a photo using a camera associated with and/or part of the HMD.

FIG. 10 shows that the intermediate tier of multi-tiered user model 400 provides tap, swipe forward, swipe backward, voice, and camera button press operations as described above in the context of the basic tier. Also, the intermediate tier provides camera button long press, two finger swipe forward, two finger swipe backward, and two finger swipe down operations.

The camera button long press operation can instruct the HMD to provide a capture menu for display and use. The capture menu can provide one or more operations for using the camera associated with HMD.

In some embodiments, Z-axis oriented movement within an HMD display can be performed by a wearer can swipe toward, swipe away, swipe up, using two fingers on the touchpad of the HMD. For example, a two-finger swipe forward (swipe away) can be interpreted as moving away or decreasing a Z-axis coordinate, and a two-finger swipe backward (swipe toward) can be interpreted as moving toward or increasing the Z-axis coordinate. In some scenarios, a two-finger swipe backward can be used to zoom in on one or more cards and a two-finger swipe forward can be used to zoom out from one or more cards.

The two finger swipe down can cause the HMD to sleep. In some embodiments, the two finger swipe down can save the current position in the timeline for recall and redisplay upon awakening the HMD.

FIG. 10 shows that the advanced tier of multi-tiered user model 400 provides tap, swipe forward, swipe backward, voice, and camera button press operations as described above in the context of the basic tier, as well as camera button long press, two finger swipe forward, two finger swipe backward, and two finger swipe down operations described above in the context of the intermediate tier. The advanced tier also provides one-finger press-and-hold, two-finger press-and-hold, and nudge operations.

The two-finger press-and-hold can provide a "clutch" operation, which can be performed by pressing on the touch-based UI in two separate spots using two fingers and holding the fingers in their respective positions on the touch-based UI. After the fingers are held in position on the touch-based UI, the clutch operation is engaged. In some embodiments, the HMD recognizes the clutch operation only after the fingers are held for at least a threshold period of time (e.g., one second). The clutch operation will stay engaged as long as the two fingers remain on the touch based UI.

The nudge operation can be performed using a short, slight nod of the wearer's head. For example, the HMD can be configured with accelerometers or other motion detectors that can detect the nudge and provide an indication of the nudge to the HMD. Upon receiving indication of a nudge, the HMD can toggle an activation state of the HMD. That is, if the HMD is active (e.g., displaying a card on the activated display) before the nudge, the HMD can deactivate itself (e.g., turn off the display) in response. Alternatively, if the HMD is inactive before the nudge but is active enough to detect nudges (e.g., within two or a few seconds of notification of message arrival) the HMD can activate itself in response.

By way of further example, in one scenario, the HMD is powered on with the display inactive. In response to the HMD receiving a new text message, an audible chime can be emitted by the HMD. Then, if the wearer nudges within a few seconds of the chime, the HMD can activate and present a card or a Z-axis oriented display with the content of the text message. If, from the activated state, if the user nudges again, the display will deactivate. Thus, in this example, the user can interact with the device in a completely hands-free manner.

As mentioned above, the UI maintains a timeline or ordered sequence of cards that can be operated on using the operations described in FIG. 10 immediately above. FIG. 11 shows a scenario 500 of example interactions with a single timeline of cards, according to an example embodiment.

Scenario 500 begins with home card 502 being displayed by an HMD acting as a computing device and worn by a wearer. Home card 502 and cards 520a-520c can be arranged as a "timeline" or sequence of cards ordered based on time. FIG. 11 shows that cards 520a-520c are arranged along the X-axis of device coordinate system 250. In the example shown in FIG. 11, each card in timeline 510 has a specific time associated with the card.

Timeline 510 can be ordered along the X-axis based on the specific times associated with the cards in the timeline. In some cases, the specific time can be "now" or the current time. For example, home card 502 can be associated with the specific time of now. In other cases, the time can be a time associated with an event leading to the card. For example, FIG. 11 shows that card 520a represents a photo taken at a time 2 hours ago. Then, card 520*a* can be associated with the specific time of 1:28, which is 2 hours before the current time of 3:28 shown on home card 502. As the specific time of card 520*a* is less than now, the time associated with home card 502, card 520*a* is shown having a smaller X component in device coordinate system 250 than home card 502.

Cards 520*b*-520*f* represent current cards, or cards associated with the specific time of now, or upcoming cards, or cards associated with a future time. For example, card 520*b* is a current card that includes an image currently generated by a camera associated with the HMD, card 520*c* is a current card that includes an image of a "hangout" or video conference call currently in-progress generated by an application of the HMD, card 520*d* is a current card that includes an image and text currently generated by a navigation application/process presently running on the HMD, card 520*e* is a current card that includes images and text currently generated by a weather application of the HMD, and 520*f* is an upcoming card that includes images and text generated by a calendar application of the HMD indicating an appointment for "Lunch with Monica Kim" in "2 hours."

In some embodiments, home card 502 can be the left-most card along timeline 510 associated with the time of now (i.e., home card 502 can have the smallest X component for all cards associated with the time of now). Then, cards 520*b*-520*f*, each of which are associated with either a time of now or a later time, can have a larger X component in device coordinate system 250 than home card 502.

In scenario 500, the HMD can enable navigation of timeline 510 using swipe operations. For example, starting at home card 502, a swipe backward operation can cause the HMD to select and display a previous card, such as card 520*a*, and a swipe forward operation the HMD to select and display a next card, such as card 520*b*. Upon displaying card 520*b*, the swipe forward operation can cause the HMD to select and display the previous card, which is home card 502, and the swipe backward operation can cause the HMD to select and display the next card, which is card 520*c*.

In scenario 500, there are no cards in timeline 510 that are previous to card 520*a*. In one embodiment, the timeline is represented as circular. For example, in response to a swipe backward operation on card 520*a* requesting a previous card for display, the HMD can select 520*f* for (re)display, as there are no cards in timeline 510 that are after card 520*f* during scenario 500. Similarly, in response to a swipe forward operation on card 520*f* requesting a next card for display, the HMD can select 520*a* for (re)display, as there are no cards in timeline 510 that are after card 520*f* during scenario 500.

In another embodiment, instead of a circular representation of the timeline, when the user navigates to the end of the timeline, a notification is generated to indicate to the user that there are no additional cards to navigate to in the instructed direction. Examples of such notifications could include any of or a combination of any of a visual effect, an audible effect, a glowing effect on the edge of the card, a three dimensional animation twisting the edge of the card, a sound (e.g. a click), a textual or audible message indicating that the end of the timeline has been reached (e.g. "there are no cards older than this"). Alternatively, in one embodiment, an attempt by the user to navigate past a card in a direction where there are no additional cards could result in no effect, i.e. swiping right on card 520*a* results in no perceptible change to the display or card 520*a*.

As one card is displayed at a time in scenario 500, the HMD can be considered as presenting a single-card view of timeline 510 to the wearer of the HMD where the displayed card occupies substantially all of the viewing area provide by the HMD. As all cards in timeline 510 are arrayed along a single axis or dimension, the single-card view of timeline 510 can be considered as a 1D view of a timeline. In some embodiments discussed below, multiple cards of a timeline, such as timeline 510 can be displayed simultaneously. In those embodiments, 1D view of the timeline can also include the multiple cards of the timeline arrayed along a single axis, such as timeline 510 shown in FIG. 11 arrayed along the X axis.

Figure 12A:
FIG. 12A is an example incoming message and response user interface displayed on a head-mountable display, according to an embodiment.
Figure 12B:
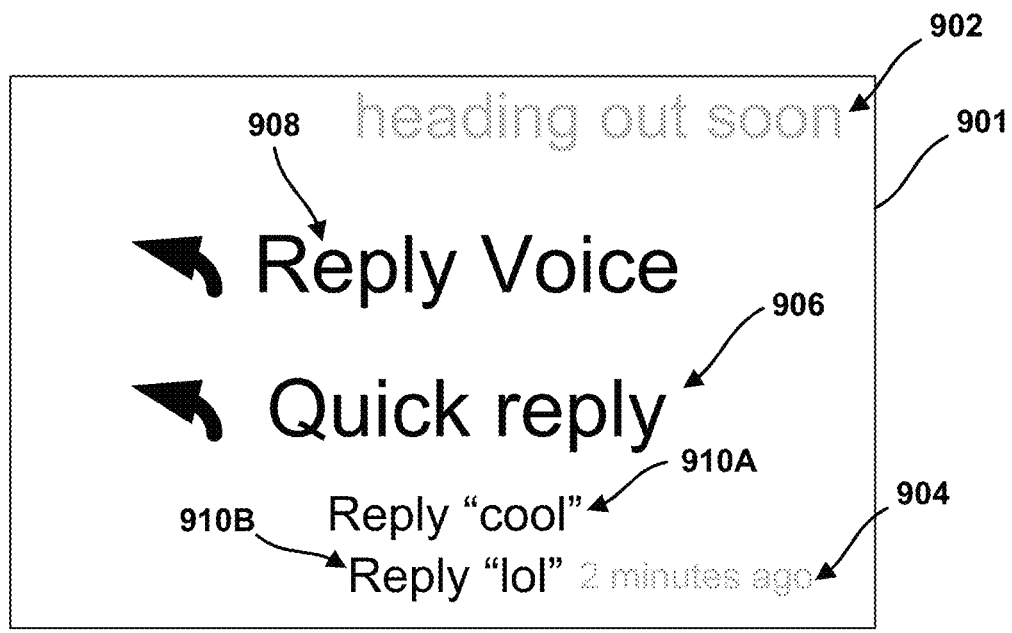
FIG. 12B is another example incoming message and response user interface displayed on a head-mountable display, according to an embodiment.

FIGS. 12A and 12B illustrate example UI cards that include messages and canned responses/messages that may be particularly adapted for display on a head-mountable device (HMD). In FIG. 12A, a UI response card 900 includes an incoming message 902 "heading out soon" generally in an upper right corner of the display. The card 900 also includes a timestamp 904 for the incoming message 902. In the illustrated example, the timestamp 904 indicates that the message was received 2 minutes ago. Additional information, such as an identity of a sender, may also be included in the card when the message 902 is received.

FIG. 12A, however, illustrates a UI response card 900 that can be provided to help a user to provide a response to the incoming message 902. In FIG. 12A, the UI response card 900 includes one or more canned response commands 906A, 906B that can be selected by a user to reply to the incoming message 902 with the canned response "cool" or "lol," for example. In the present example, the canned response command 906 is provided in a prominent position generally in a center of the card, while the incoming message 902 and the timestamp 904 may be shown in a background of the card. The canned response command 906 can be highlighted in some form or another (e.g., shown in bold or underlined), and the incoming message 902 and the timestamp 904 can be made less visible or prominent in the card 900. In FIG. 12A, the card 900 also includes a voice response command 908 that can be selected by a user to reply to the incoming message using a voice-to-text feature, for example.

In FIG. 12A, the canned response command 906 is provided as a top-level menu that a user may select to reply with the canned response "cool" and/or "lol." A single canned response may be provided in each UI response card 900 of a bundle of cards, or multiple canned responses may be provide in a single UI response card. When a single canned response is provide in each UI response card 900, the user can scroll through the various canned response cards using a head movement, voice command, and/or touchpad input, for example. In examples where multiple canned responses are provided in a single UI response card 900, only a partial view of the multiple canned responses may be visible at once, and the user can scroll through the multiple canned responses on the card using a head movement, voice command, and/or touchpad input, for example.

FIG. 12B illustrates another example, in which a UI response card 901 includes a canned response command 906 that can be selected to then provide a submenu 910 that includes one or more commands to reply with a particular canned response (e.g., Reply "cool" 910A and Reply "lol" 910B). As discussed above, the user can scroll through the canned responses in the submenu 910 on the card using a head movement, voice command, and/or touchpad input, for example.

To select the commands 906, 910, and to reply to the incoming message 902 "heading out soon" with the canned response "cool" or "lol," a user of the HMD may provide an input on a touchpad (e.g., the touchpad 624), by using a verbal command (e.g., by saying "quick reply, reply cool" or "quick reply, reply lol," which is received as an input through the microphone 622, for example), or by looking at the canned response command (e.g., by utilizing a sensor 621 and/or 623 that detects a user's eye movements), for example. In FIG. 12B, the voice response command 908 is also an option for the user. The example UI response cards of FIGS. 12A and 12B allow a user of an HMD to intuitively and quickly respond to an incoming message on a relatively small display 900, and when other input devices (e.g., a keyboard or a keypad representation on a larger touchpad) are not available. After the HMD sends the reply to the incoming message with the selected one or more canned responses (and perhaps other text and content), the HMD can provide another card that includes details of the sent message.

In other examples, the incoming message 902, time stamp 904, and other information (e.g., a sender identity) can be included in a separate card, and the user can access the UI response card 900, 901 by providing a user input, such as through a touchpad, head or eye movement, or voice command. The separate card for the incoming message 902 and perhaps other information can be added to the timeline and associated with other messages in the same conversation so that a user can go back to the incoming message, view the entire conversation, and take actions related to the conversation (e.g., delete, reply, forward, and the like).

In one example, when the user provides a command to access one or more UI response cards, the HMD may provide a particular UI response card format (e.g., the top-level menu of card 900 or the submenu of card 901), based on the number of canned responses and/or the length of the canned responses. For instance, if there are only a few canned responses and/or the canned responses are relatively short in length, then the HMD may provide the format of the UI response card 900, which shows the canned responses in a larger font. However, if there are many canned responses and/or the canned responses are relatively long in length, then the HMD may provide the format of the UI response card 901, which shows the canned responses in a smaller font in the submenu. Various other examples are also possible and contemplated in the present disclosure.

CONCLUSION

Although some of the examples herein are described with respect to a mobile platform, the examples are not meant to be limiting. The systems and methods described herein may be applicable to any type of computing device such as mobile and/or stationary computing platforms.

The present disclosure relates to a process or algorithm (e.g., a machine-learning application or algorithm), that can be executed by a computing device or system (e.g., a user's mobile phone, an HMD, a server, and/or some other computing device that is communicatively coupled to the mobile phone, HMD, and/or the server) to determine the canned responses based, at least in part, on the communications associated with a user account (e.g., a user's phone number, email address, username, and the like). The machine-learning application may take the form of software running on the computing platform that may be executed to provide functionality for software applications to learn from interactions of user(s) of the computing platform.

In the present disclosure, the canned responses may be particularly useful on an HMD, since the device doesn't include an integrated keyboard, and generally the side-mounted touchpad is small and separate from the display, thus limiting touch interaction as compared to, e.g., a smartphone with a touchscreen display. When using an HMD, a user may select a desired canned response/message by providing an input on a small touchpad, using a verbal command, simply looking at the desired response/message, and the like.

Generally, an individual user or a group of users may create data-based "user-account," which may also be referred to simply as an "account." A user-account for a particular user or user group may include data related to the particular user or user group, which the user or user group has opted to provide for the user-account. As such, a particular user's account may, in a sense, be a data-based representation of that particular user. A user may create an account for various applications, web sites, and/or online services, for instance. Examples of user accounts include e-mail accounts, social network accounts, online financial accounts, accounts with service providers, cellular service accounts that may be associated with phone numbers, among other possibilities. Further, in some cases, a user may have a single user-account that provides as a data-based representation of the user for multiple services, websites, applications, etc. For instance, a user could opt to use their e-mail account or social network account as a common login for various online services and applications, which are provided by a number of different entities. Further, a user of a computing device, such as a mobile phone, laptop computer, or wearable computing device, may associate their user-account with the computing device itself, such that while the user is operating the computing device, their account will be associated with applications that are provided on the computing device.

It should also be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

Generally, the methods 100, 180 described herein may include one or more operations, processes, or actions as illustrated by the one or more of respective blocks. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for methods and other processes disclosed herein, the block diagram or flow chart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the methods and other processes disclosed herein, each block in the respective flow charts may represent circuitry that is wired to perform the specific logical functions in the process.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   for each of one or more messages that are selected from a plurality of messages from an account:
   (a) extracting one or more phrases from a respective selected message;
   (b) determining that a conversation includes the respective selected message and one or more other messages from the plurality of messages;
   (c) generating a first feature vector based on the conversation, wherein the first feature vector includes one or more first features, wherein the one or more first features include one or more words from the conversation; and
   (d) generating, by a computing system, one or more training-data sets, wherein each training-data set comprises one of the phrases and the first feature vector;
   training, by the computing system, a machine-learning application with at least a portion of the one or more training-data sets that are generated for the one or more selected messages;
   applying the trained machine-learning application to process an incoming message to the account;
   responsive to applying the trained machine-learning application, determining one or more reply messages corresponding to the incoming message, wherein the one or more reply messages include at least one of the extracted one or more phrases; and
   displaying one or more cards on a display of a head-mountable device (HMD), wherein the one or more cards include at least a portion of the incoming message and the one or more reply messages corresponding to the incoming message.

2. The method of claim 1, further comprising receiving data input by the HMD indicating a selection of a particular one of the one or more reply messages and, responsively, sending the reply message and displaying a message card describing the reply message.

3. The method of claim 2, wherein receiving input via the HMD includes receiving input through one or more of a microphone, a touchpad disposed on the HMD, or an eye-tracking sensor.

4. The method of claim 1, wherein the one or more cards further includes a voice response command along with the one or more reply messages.

5. The method of claim 1, further comprising determining, by the computing system based on one or more of a number of the one or more reply messages or a length of the one or more reply messages, to arrange the one or more reply messages of the one or more cards in a top-level menu format or a submenu format.

6. The method of claim 1, wherein applying the trained machine-learning application to an incoming message further comprises:
   processing, by the computing system, the incoming message to generate a second feature vector based on the incoming message, wherein the second feature vector includes one or more second features of the incoming message, wherein the one or more second features include one or more words;
   processing, by the computing system using the trained machine-learning application, the second feature vector to identify one or more of the extracted phrases as the one or more reply messages; and
   initiating, by the computing system, the display of the one or more reply messages on the display for selection to reply to the incoming message.

7. The method of claim 6, wherein generating the first feature vector includes identifying a sender of the one or more other messages in the conversation, wherein the one or more first features include an identity of the sender of the one or more other messages, wherein processing the incoming message includes identifying a sender of the incoming message, and wherein the one or more second features include an identity of the sender of the incoming message.

8. The method of claim 7, further comprising identifying one or more voice calls from the sender of the one or more other messages in the conversation, wherein the first feature vector includes information regarding the one or more voice calls.

9. The method of claim 1, wherein extracting one or more phrases includes normalizing the respective selected message by converting text to lowercase letters and removing punctuation, and using a natural language toolkit sentence tokenizer to extract the one or more phrases from the respective selected message.

10. The method of claim 1, wherein generating the first feature vector includes normalizing the one or more other messages in the conversation by converting words to lowercase letters, removing punctuation, removing stop words, and removing hash (#) characters.

11. The method of claim 10, wherein normalizing the one or more other messages includes converting ASCII emoticons into respective Unicode forms, and wherein the one or more first features include the Unicode forms of the ASCII emoticons.

12. The method of claim 10, wherein normalizing the one or more other messages includes categorizing images and Internet links as a generic feature, and wherein the one or more first features include the generic feature.

13. The method of claim 1, wherein generating the first feature vector includes identifying one or more times that correspond to when one or more other messages in the conversation were sent or received, and wherein the one or more first features include the identified one or more times.

14. The method of claim 1, further comprising removing, before training, one or more phrases from the training-data sets that appear fewer than a threshold number of times.

15. The method of claim 1, further comprising using metrics to determine the one or more reply messages corresponding to the incoming message, and wherein the metrics relate to one or more of how often a reply message is selected to respond to an incoming message or how often the reply responses are provided for selection.

16. The method of claim 1, further comprising:
processing, by the computing system, a message to be sent from the account to create a third feature vector that includes an identity of a recipient of the message to be sent as a feature;
processing, by the computing system using the trained machine-learning application, the third feature vector to determine one or more second messages that may be included in the message to be sent; and
initiating a display of the one or more second messages on the display.

17. A system comprising:
a non-transitory computer-readable medium; and
program instructions stored on the non-transitory computer-readable medium and executable by at least one processor to:
for each of one or more messages that are selected from a plurality of messages from an account:
(a) extract one or more phrases from a respective selected message;
(b) determine that a conversation includes the selected message and one or more other messages from the plurality of messages;
(c) generate a first feature vector based on the conversation, wherein the first feature vector includes one or more first features, wherein the one or more first features include one or more words from the conversation; and
(d) generate one or more training-data sets, wherein each training-data set comprises one of the phrases and the first feature vector;
train a machine-learning application with at least a portion of the one or more training-data sets that are generated for the one or more selected messages;
apply the trained machine-learning application to process an incoming message to the account;
responsive to applying the trained machine-learning application, determine one or more reply messages corresponding to the incoming message, wherein the one or more reply messages include at least one of the extracted one or more phrases; and
initiate a display of the one or more reply messages on a graphic display of a head-mountable device (HMD).

18. The system of claim 17, wherein the program instructions stored on the non-transitory computer-readable medium and executable by at least one processor to apply the trained machine-learning application to process an incoming message further include instructions to:
process the incoming message to create a second feature vector based on the incoming message, wherein the second feature vector includes one or more second features of the incoming message, wherein the one or more second features include one or more words;
process, using the trained machine-learning application, the second feature vector to identify one or more of the extracted phrases as the one or more reply messages; and
provide the one or more reply messages for selection to reply to the incoming message.

19. The system of claim 17, further comprising program instructions stored on the non-transitory computer-readable medium and executable by at least one processor to:
process a message to be sent from the account to create a third feature vector that includes an identity of a recipient of the message to be sent as a feature;
process, using the trained machine-learning application, the third feature vector to determine one or more second messages that may be included in the message to be sent; and
initiate a display of the one or more second messages on a graphic display.

20. A non-transitory computer-readable medium having stored thereon instructions executable by a computing device to cause the computing device to perform functions comprising:
for each of one or more messages that are selected from a plurality of messages from an account:
(a) extracting one or more phrases from a respective selected message;
(b) determining that a conversation includes the selected message and one or more other messages from the plurality of messages;
(c) generating a first feature vector based on the conversation, wherein the first feature vector includes one or more first features, wherein the one or more first features include one or more words from the conversation; and
(d) generating one or more training-data sets, wherein each training-data set comprises one of the phrases and the first feature vector;
training a machine-learning application with at least a portion of the one or more training-data sets that are generated for the one or more selected messages;
applying the trained machine-learning application to process an incoming message to the account;
responsive to applying the trained machine-learning application, determining one or more reply messages corresponding to the incoming message, wherein the one or more reply messages include at least one of the extracted one or more phrases; and
initiating a display of the one or more reply messages on a graphic display of a head-mountable device (HMD).

21. The non-transitory computer-readable medium of claim 20, wherein the instructions for applying the trained machine-learning application to an incoming message further comprises instructions executable by the computing device to cause the computing device to perform functions comprising:
processing the incoming message to create a second feature vector based on the incoming message, wherein the second feature vector includes one or more second features of the incoming message, wherein the one or more second features include one or more words;
processing, using the trained machine-learning application, the second feature vector to identify one or more of the extracted phrases as the one or more reply messages; and
providing the one or more reply messages for selection to reply to the incoming message.

22. The non-transitory computer-readable medium of claim 20, further comprising instructions executable by the computing device to cause the computing device to perform functions including:
processing a message to be sent from the account to create a third feature vector that includes an identity of a recipient of the message to be sent as a feature;

processing, using the trained machine-learning application, the third feature vector to determine one or more second messages that may be included in the message to be sent; and initiating a display of the one or more second messages on the graphic display.

\* \* \* \* \*